No. 698,679. Patented Apr. 29, 1902.
T. DUNCAN.
ELECTRICAL MEASURING INSTRUMENT.
(Application filed Jan. 2, 1900. Renewed Dec. 16, 1901.)
(No Model.)
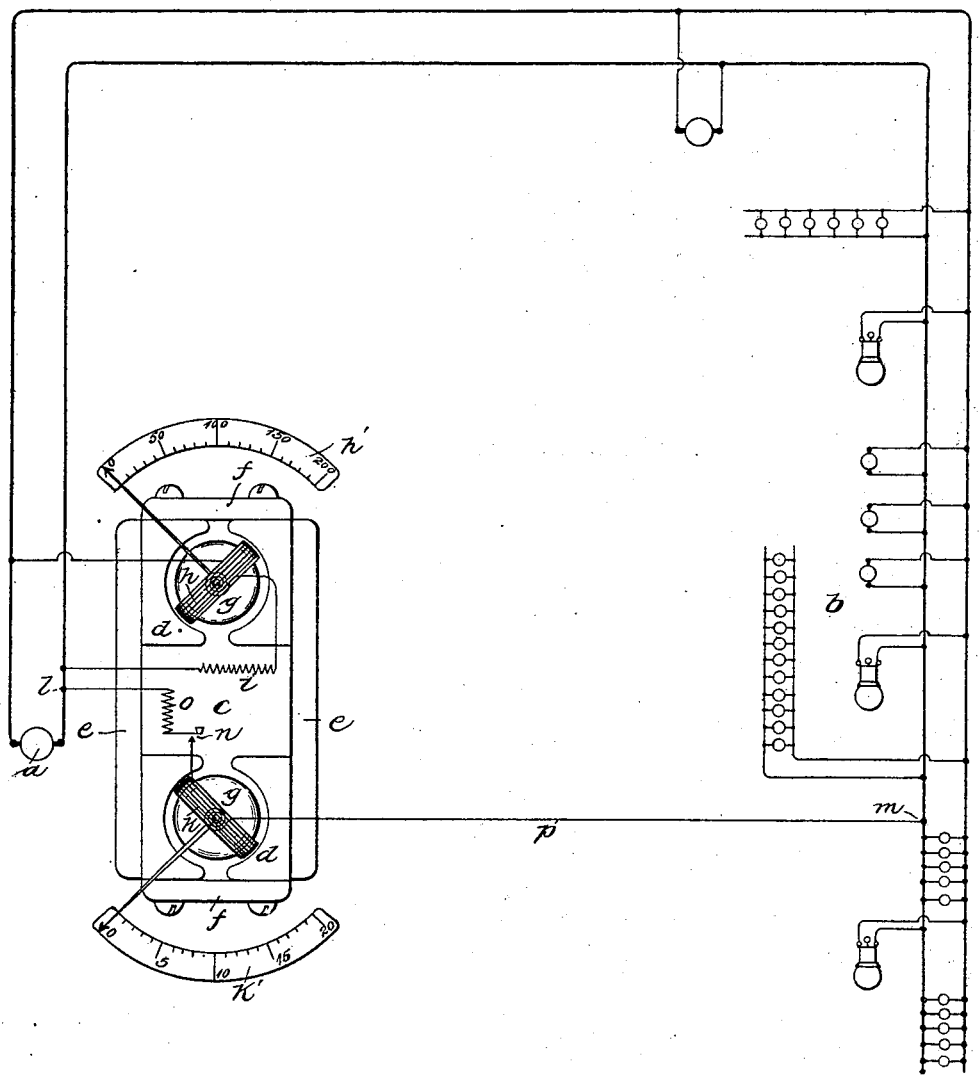
Witnesses
Max Zabel.
C. J. Schmidt.
Inventor
Thomas Duncan
By Charles A. Brown & Bragg
Attorneys

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,679, dated April 29, 1902.

Application filed January 2, 1900. Renewed December 16, 1901. Serial No. 86,060. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 341,) of which the following is a full, clear, concise, and exact description, reference being had to the accompanying drawing, forming a part of this specification.

My invention relates to compensating voltmeters, and has for its object the provision of improved means for determining the electromotive force at any predetermined point of a system of distribution, my invention enabling me to accurately secure this result.

When the pressure at any point distant from the generating-station is accurately determined, this pressure may be maintained constant by regulation of the impressed pressure to compensate for load changes and the C R drop over the distributing-lines due thereto, which varies directly as the load. Two ways have hitherto been frequently practiced for measuring the pressure at a predetermined point in the line distant from the generating-station. A common way is to employ an ordinary voltmeter upon the station-switchboard, which is connected to a distant point of the circuit—as, for example, the center of distribution—by means of two pressure-wires, the instrument then indicating the pressure at the distant point. When the distance between the distant predetermined point of the line and the generating-station is great, the expense of these pressure-wires is significant when a great number of machines are used. It has also been the practice to employ what are termed "compound compensating voltmeters" containing two windings, one a pressure-winding connected between the generator-terminals and the other a counter compounding or demagnetizing winding comprising one or more turns of the series or main conductor upon the same voltmeter-spool with the shunt-winding, the current increasing the counter-magnetizing effect of the series winding as the load increases to give a resultant magnetizing effect which indicates the "pressure reduction" in the transmission-lines. The number of turns of the series or current winding is dependent upon the percentage of drop in the mains. This latter method, however, is objectionable, as a true compensation is not always effected in the meter for the C R drop, since the counter-magnetizing effect of the series winding would be the same irrespective of the distance of the load from the generator.

By means of my present invention I am enabled to eliminate one or both of the pressure-wires employed in one of the aforesaid prior methods to reduce the cost of line construction and at the same time maintain accuracy in the determination of the pressure at the distant point of distribution where the pressure is to be measured.

In practicing my invention I employ a meter having a winding connected or adapted for connection between two distant points of the system of distribution, preferably between a point on one transmission-main at the generator-station and another point of the same main at the distant place where the pressure is to be determined. A torque is created by this winding which is proportional to the C R drop between the connected points. In my present invention I also employ a second winding, which is connected across the generator-terminals.

In practicing my present invention I have provided a pointer and scale associated with each of the windings, whereby the C R drop and the pressure at the generator-terminals may be separately measured. In order to ascertain the difference in potential at the predetermined distant point, twice the C R drop in one transmission-conductor should be subtracted from the indicated pressure at the generator-terminals. The portion of the apparatus for measuring the C R drop in one transmission-line is preferably so calibrated as to indicate directly the total C R drop, so that it is only necessary to take the difference between the readings to determine the pressure at the predetermined distant point. I may use ground return in place of a single pressure-wire, thereby further reducing the cost of line construction.

I am enabled to overcome the disadvantages of the second aforesaid prior method of determining the pressure at points distant from the generator-station in that I am enabled to accurately determine this pressure irrespective of the distribution of the load.

I will explain my invention more particularly by reference to the accompanying drawing, which diagrammatically indicates apparatus constructed in accordance with my invention and a system of distribution with which the said apparatus is connected.

I have indicated a system for distributing direct current, a source of direct current $a$ being shown as supplying current to translating devices $b$.

The apparatus $c$ may be constructed as shown, two sets of field-poles $d\,d$, of soft iron, being provided, permanent bar-magnets $e\,e$ and brass distance-pieces $f\,f$ being employed to secure the poles in position. An iron core $g$, which is preferably stationary, is disposed between the poles of each pair. A coil $h$ of fine wire mounted upon a rotatable shaft surrounds the upper core $g$ and is disposed between the upper pair of poles, this coil being included in circuit between the generator-terminals, a resistance $i$ extraneous to the said coil being included in the same cross-conductor therewith to prevent an undue flow of current through said coil. A torque is thus produced proportional to the pressure of the generator upon the transmission-mains. Torsional springs may be provided in the well-known way to oppose this torque. I have shown a pointer mounted to swing with the coil and a scale $h'$, upon which the generator-pressure may be read. A coil $k$ is similarly mounted to swing upon a shaft, this coil inclosing the lower core $g$ and being disposed between the lower pair of poles. This coil may be included between separated points $l$ and $m$ on the same transmission-main (in this instance the generator-terminal) and a distant point of distribution, respectively, by means of a key $n$, which may be employed, an extraneous resistance $o$ being preferably adapted for inclusion in the same circuit with the coil $k$. I have shown a metallic pressure-conductor $p$ for connecting the points $l$ and $m$. A part of this pressure-conductor may be replaced by a ground-conductor, if desired, as is well understood in the art. The point $m$ may be at the center of distribution or at the extreme end of the system of distribution, or a point between the extreme end and the center of distribution, or any other point distant from the generating-station. Upon closing the key $n$ a torque will be created in the instrument which will be proportional to the $c\,r$ drop. In order that this $c\,r$ drop may be measured, I provide a pointer to be actuated by the movable coil $k$ and a scale $k'$, this portion of the apparatus being preferably calibrated to indicate the total $c\,r$ drop in both mains. Torsional springs are provided in connection with the coil $k$, similar to those provided in connection with the coil $h$, which act in the same way. The coil $k$ is thus adapted for inclusion in shunt of a main transmission-conductor or a portion thereof. The movement of the coil $k$ will be proportional to the drop in volts over the lead or main wire to which it is connected, and when there is no load on the system the reading of this portion of the apparatus will be zero. As the load increases the drop in volts over the conductor or the portion of the conductor which the coil $h$ and its connections shunt will also increase in direct proportion. If, for example, the system should be a one-hundred-volt system and the reading at the scale $h'$ should be one hundred volts, while the reading at the scale $k'$ should be ten volts, then the pressure at the generator should be increased to about one hundred and ten volts to secure the standard pressure at the distant point $m$.

By means of the apparatus of my present invention I am enabled to determine the total energy given out by the generator, which is the current times the reading at the scale $h'$ or $c\,e$ and the energy consumed in the lines or main leads, which will be the current times the reading at the scale $k'$ or $C^2\,R$. The difference between these two products will indicate the amount of energy available for the translating devices. The resistance of the transmission mains or leads may also be ascertained by dividing the drop in volts (indicated on scale $k'$) by the current in amperes—
$i.\ e.,\ \dfrac{C\,R}{c} = r.$ In the present embodiment of my invention I have shown the apparatus as being formed into an integral instrument for the sake of compactness; but it is obvious that the apparatus might be separated without departing from the spirit of my invention.

In some of the claims I speak of the windings of the meter as being connected with the transmission circuit and generator, and while I have specifically disclosed the application of my invention to a direct-current system of electrical distribution I do not wish to be limited to conductive connections of the meter-windings with the transmission-circuit.

While I have herein shown and particularly described one embodiment of my invention, it is obvious that changes may readily be made without departing from the spirit thereof, and I do not, therefore, wish to be limited to the precise construction shown; but,

Having thus described my invention, I claim as new and desire to secure by Letters Patent—

1. In a system of electrical distribution, the combination with a generator supplying current to a transmission-circuit, of a measuring apparatus having a voltmeter-winding connected across the generator-terminals, and a second pressure-winding connected between a point of the transmission-circuit and a second and distant point of the transmission-circuit where the pressure is to be determined to determine the $c\,r$ drop, whereby the pressure at distant points of the transmission-circuit may be readily determined, substantially as described.

2. In a system of electrical distribution, the combination with a generator supplying current to a transmission-circuit, of a measuring apparatus having a voltmeter-winding connected across the generator-terminals, a second pressure-winding connected between a point of the transmission-circuit and a second and distant point of the transmission-circuit where the pressure is to be determined to determine the $c\,r$ drop, whereby the pressure at distant points of the transmission-circuit may be readily determined, and a separate measuring element for and coöperating with each of said windings, substantially as described.

3. In a system of electrical distribution, the combination with a generator supplying current to a transmission-circuit, of a measuring apparatus having a voltmeter-winding connected across the generator-terminals, a second pressure-winding connected between a point of the transmission-circuit and a second and distant point of the transmission-circuit where the pressure is to be determined, to determine the $c\,r$ drop, whereby the pressure at distant points of the transmission-circuit may be readily determined, and a switch for opening and closing the circuit through the second winding, substantially as described.

4. In a system of electrical distribution, the combination with a generator supplying current to a transmission-circuit, of a measuring apparatus having a voltmeter-winding connected across the generator-terminals, a second pressure-winding connected between a point of the transmission-circuit and a second and distant point of the transmission-circuit where the pressure is to be determined, to determine the $c\,r$ drop, whereby the pressure at distant points of the transmission-circuit may be readily determined, a separate measuring element for, and coöperating with, each of said windings, and a switch for opening and closing the circuit through the second winding, substantially as described.

5. In a system of electrical distribution, the combination with a generator supplying current to a transmission-circuit, of a measuring apparatus having a voltmeter-winding connected across the generator-terminals, and a second pressure-winding connected between a point of the transmission-circuit and a second and distant point of the transmission-circuit where the pressure is to be determined to determine the $c\,r$ drop, whereby the pressure at distant points of the transmission-circuit may be readily determined, said second winding being connected, or adapted for connection, in shunt of one side, or a portion of one side, of the transmission-circuit, substantially as described.

6. In a system of electrical distribution, the combination with a generator supplying current to a transmission-circuit, of a measuring apparatus having a voltmeter-winding connected across the generator-terminals, a second pressure-winding connected between a point of the transmission-circuit and a second and distant point of the transmission-circuit where the pressure is to be determined to determine the $c\,r$ drop, whereby the pressure at distant points of the transmission-circuit may be readily determined, and a separate measuring element for, and coöperating with, each of said windings, said second winding being connected, or adapted for connection, in shunt of one side, or a portion of one side, of the transmission-circuit, substantially as described.

7. In a system of electrical distribution, the combination with a generator supplying current to a transmission-circuit, of a measuring apparatus having a voltmeter-winding connected across the generator-terminals, a second pressure-winding connected between a point of the transmission-circuit and a second and distant point of the transmission-circuit where the pressure is to be determined, to determine the $c\,r$ drop, whereby the pressure at distant points of the transmission-circuit may be readily determined, and a switch for opening and closing the circuit through the second winding, said second winding being connected, or adapted for connection, in shunt of one side, or a portion of one side, of the transmission-circuit, substantially as described.

8. In a system of electrical distribution, the combination with a generator supplying current to a transmission-circuit, of a measuring apparatus having a voltmeter-winding connected across the generator-terminals, a second pressure-winding connected between a point of the transmission-circuit and a second and distant point of the transmission-circuit where the pressure is to be determined, to determine the $c\,r$ drop, whereby the pressure at distant points of the transmission-circuit may be readily determined, a separate measuring element for, and coöperating with, each of said windings, and a switch for opening and closing the circuit through the second winding, said second winding being connected, or adapted for connection, in shunt of one side, or a portion of one side, of the transmission-circuit, substantially as described.

9. In a system of electrical distribution, the combination with a generator supplying current to a transmission-circuit, of a measuring apparatus having a voltmeter-winding connected across the generator-terminals, and a second pressure-winding connected between a point of the transmission-circuit and a second and distant point of the transmission-circuit where the pressure is to be determined, to determine the $c\,r$ drop, whereby the pressure at distant points of the transmission-circuit may be readily determined, each of said windings being rotatably mounted upon a shaft independent of the other, substantially as described.

10. In a system of electrical distribution, the combination with a direct-current generator, supplying current to a transmission-circuit, of a measuring apparatus having a voltmeter-winding conductively united with and included between the generator-terminals, and a second pressure-winding conductively uniting a point of the transmission-circuit with a second and distant point of the transmission-circuit where the pressure is to be determined, to determine the $c\,r$ drop, whereby the pressure at distant points of the transmission-circuit may be readily determined, substantially as described.

11. In a system of electrical distribution, the combination with a direct-current generator supplying current to a transmission-circuit, of a measuring apparatus having a voltmeter-winding conductively united with and included between the generator-terminals, a second pressure-winding conductively uniting a point of the transmission-circuit with a second and distant point of the transmission-circuit where the pressure is to be determined, to determine the $c\,r$ drop, whereby the pressure at distant points of the transmission-circuit may be readily determined, and a separate measuring element for, and coöperating with, each of said windings, substantially as described.

12. In a system of electrical distribution, the combination with a direct-current generator supplying current to a transmission-circuit, of a measuring apparatus having a voltmeter-winding conductively united with and included between the generator-terminals, a second pressure-winding conductively uniting a point of the transmission-circuit with a second and distant point of the transmission-circuit where the pressure is to be determined, to determine the $c\,r$ drop, whereby the pressure at distant points of the transmission-circuit may be readily determined, and a switch for opening and closing the circuit through the second winding, substantially as described.

In witness whereof I hereunto subscribe my name this 20th day of December, A. D. 1899.

THOMAS DUNCAN.

Witnesses:
WILLIAM F. MEYER,
JAMES W. DALTON.